United States Patent [19]

Liu et al.

[11] Patent Number: 5,012,011
[45] Date of Patent: Apr. 30, 1991

[54] FLUORINATED VINYL ETHER

[75] Inventors: Kou-Chang Liu, Wayne; Paul D. Taylor, West Milford, both of N.J.

[73] Assignee: GAF Chemicals Corporation, Wayne, N.J.

[21] Appl. No.: 424,472

[22] Filed: Oct. 20, 1989

[51] Int. Cl.$^5$ .................. C07C 43/215; C07C 43/225
[52] U.S. Cl. .................................... 568/610; 568/615; 568/626
[58] Field of Search ............... 568/607, 626, 615, 608, 568/610

[56] References Cited

U.S. PATENT DOCUMENTS 4,559,179 12/1985 Hisamoto et al. .................. 568/610

Primary Examiner—Werren B. Lone
Assistant Examiner—Margaret Argo
Attorney, Agent, or Firm—Marilyn J. Maue; Joshua J. Ward

[57] ABSTRACT

This invention relates to fluorinated vinyl ethers having the formula $$CF_3(CF_2)_t R'OCH_2CHR''OCH=CH_2$$
$$|$$
$$OH$$

wherein t has a value of from 1 to 22; R' is $C_2$ to $C_{20}$ alkylene, alkoxyalkylene, arylene or aryloxyalkylene which radicals are optionally fluorinated; R" is a divalent radical having from 1 to 100 carbon atoms and is selected from the group of alkylene, arylene, alkarylene, aralkylene which groups are optionally substituted with lower alkyl or the radical

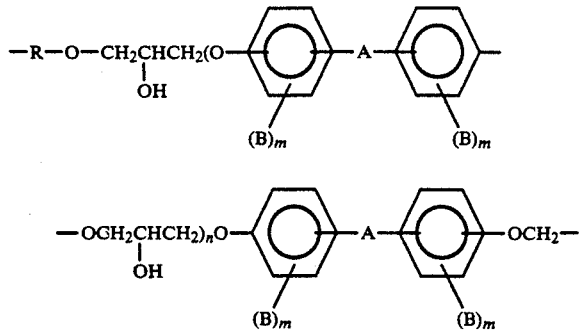

wherein R is a polyvalent linear, branched or cyclic hydrocarbon radical having from 2 to 20 carbon atoms, optionally substituted with alkyleneoxy; A is a divalent radical selected from the group of

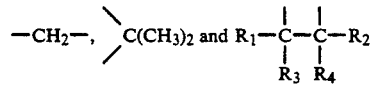

where each of $R_1$, $R_2$, $R_3$ and $R_4$ is independently hydrogen or

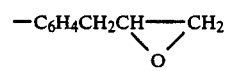

B is lower alkyl; m has a value of from 0 to 4 and n has a value of from 0 to 20. The invention also relates to the manner of synthesizing the present fluorinated vinyl ethers and to their uses as release agents and stain protective coatings.

5 Claims, No Drawings

FLUORINATED VINYL ETHER

In one aspect the invention relates to fluorinated vinyl ethers having improved properties. In other aspects the invention relates to the preparation of said fluorinated vinyl ethers and to their use as release agents and protective coating materials.

BACKGROUND OF THE INVENTION

In general, polymers of fluorinated olefins, because of their low chemical reactivity, resistance to mechanical abrasion and thermal stability are useful as protective coatings for metal, ceramic, plastic and other substrates. Certain fluorocarbons having low surface tension are found to be good release coatings used in labels, tapes and paper products.

Accordingly, it is an object of this invention to provide novel compounds having all of the above useful properties which have wide commercial application.

Another object of the invention is to provide an economical, commercially feasible process for the synthesis of the present improved products.

Still another object is to provide a durable coating material which possesses good release properties in applications such as soil release from fabrics or as release agents for use in tapes, labels and paper products.

Another object is to provide a radiation sensitive product useful as a photoresist.

These and other objects will become apparent from the following description and disclosure.

THE INVENTION

In accordance with this invention there is provided a fluorinated vinyl ether having the formula $$CF_3(CF_2)_t R'OCH_2CHR''OCH=CH_2$$
$$|$$
$$OH$$

wherein t has a value of from 1 to 22; R' is $C_2$ to $C_{20}$ alkylene, alkoxyalkylene, arylene or aryloxyalkylene which radicals are optionally fluorinated; R" is a divalent radical having from 1 to 100 carbon atoms and is selected from the group of alkylene, arylene, alkarylene, aralkylene which groups are optionally substituted with lower alkyl or the radical

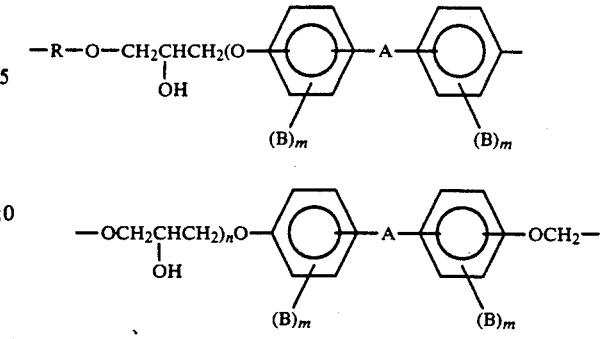

wherein R is a polyvalent linear, branched or cyclic hydrocarbon radical having from 2 to 20 carbon atoms, optionally substituted with alkyleneoxy; A is a divalent radical selected from the group of

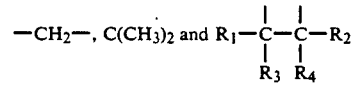

where each of $R_1$, $R_2$, $R_3$ and $R_4$ is independently hydrogen or

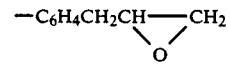

B is lower alkyl; m has a value of from 0 to 4 and n has a value of from 0 to 20.

The above compounds can be synthesized according to following equation A.

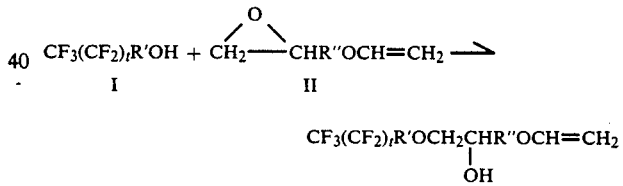

wherein R', R" and t are as defined. When coreactant II is an oligomer, as described above for R", e.g. 1-[[[[2,3-epoxypropoxy]phenyl]alkyl]phenoxy]-3-[[vinyloxy]alkoxy]-2-propanol, the reaction can be illustrated by equation B below.

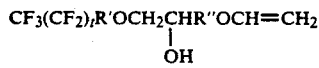

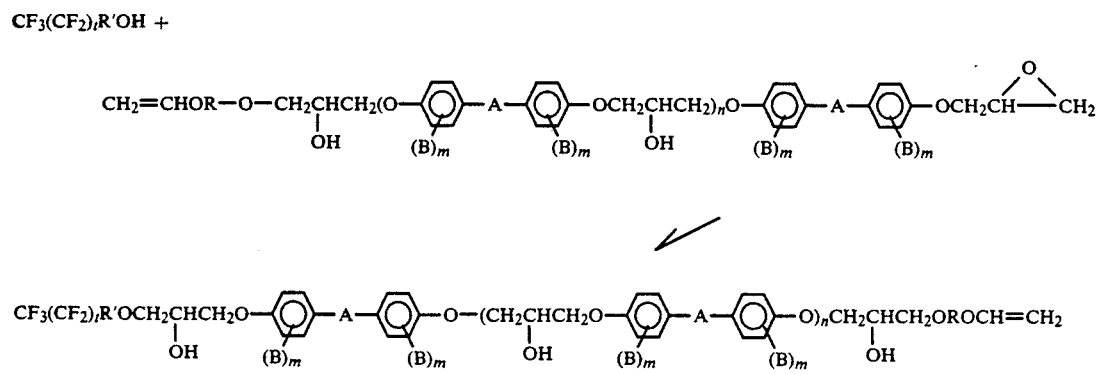

The synthesis is carried out under mild conditions such as a temperature of between about 50° and 160° C.

under atmospheric pressure for a period of from about 2 to about 50 hours, preferably at a temperature from 120° to about 150° C. for a period of from 2 to about 10 hours. The reactants may be contacted in the absence or in the presence of an inert solvent. When used, the solvent can be employed in an amount up to 70% of the reaction mixture. Suitable solvents include, toluene, xylene, the dimethyl ether of tri- or tetra- ethylene glycol and the like. The reaction is carried out in the presence of between about 0.01 and about 3 wt. %, preferably between about 0.05 and about 1 wt. % of a base catalyst such as particulate sodium, potassium or lithium metal, a sodium, lithium or potassium hydroxide or hydride, and similar base catalysts. While the present reaction is not oxygen inhibited, it is preferred to conduct the reaction under a blanket of inert gas such as nitrogen.

Examples of the vinyl ether epoxide reactant include [(vinyloxy) methyl] oxirane, [(vinyloxy) benzyl] oxirane, [(vinyloxy) phenyl] oxirane, [(vinyloxy) butyl] oxirane, [(vinyloxy) ethyl] oxirane, [(vinyloxy) octyl] oxirane, [(vinyloxy) dodecyl] oxirane, [(vinyloxy) tolyl] oxirane, [(vinyloxy)-2,3-dimethyl hexyl] oxirane, [2-(vinyloxy) ethoxy] phenyl oxirane, [[(vinyloxy) phenoxy]phenyl] oxirane, as well as any of the vinyl ether epoxides described in my co-pending patent application FDN-1808 entitled EPOXY VINYL ETHERS, filed on Oct. 20, 1989 and assigned U.S. Ser. No. 424,453 and having the general formula shown above in equation B.

Suitable fluoro alkanol reactants include pentafluoropropanol, pentafluorohexanol, nonafluoropentanol, heptafluorodecanol, heptadecafluorodecanol, pentadecafluorodecanol, undecafluoroheptanol, 2-(undecafluorocyclohexyl) ethanol, heptatricontafluoroeicosanol, nonadecafluoroeicosanol, 2-(pentafluorophenyl) ethanol, 2-[4-(pentacosafluorododecyl) tetrafluorophenoxy] ethanol, etc.

Of the above named reactants, pentadecafluorooctanol, heptadecafluorodecanol are preferred fluorinated alcohols. Preferred species of the oxirane reactant are [(vinyloxy) methyl] oxirane and the oligomers of equation B wherein n has a value of 0 or 1; m is zero; A is -C(CH$_3$)$_2$— and R is butylene.

The above compounds have been found to be excellent release coating materials. Accordingly, they can be coated on a suitable substrate such as glass, ceramic, wood, metal, woven fabrics, paper and the like in thicknesses ranging from 0.05 up to 5 mils to provide products having stain and soil resistance or labels which are easily removed from paper surfaces or backing materials for adhesive tapes and the like and many other applications which are apparent from their properties. As coating agents, curing the products of the present invention is easily effected at room temperature under ambient pressure conditions by exposure to a source of radiation such as UV light, an electron beam, lazer emission and the like in the presence of from about 0.05 to about 5 wt. % of a photoinitiator. Suitable photoinitiators are the onium salts such as the triphenyl sulfonium salt of phosphorous hexafluoride, diphenyl iodium salt, tetrazolium chloride, phenyl onium salts or aryl alkyl onium salts and the like. The amount of initiator employed is preferably between about 0.1 and about 2 wt. % with respect to reactants.

The present products can be cured in a period of less than 1 second, e.g. by exposure to between about 100 and about 800 millijoules/cm$^2$ UV light or between about 0.5 and about 5 megarads of electron beam emission. The sensitivity of the present compounds to radiation curing makes them excellent candidates for use as photoresists.

The products of this invention can also be cured by conventional thermal processes employing a temperature of from about 50° C. to about 160° C.

Having generally described the invention, reference is now had to the following examples which illustrate preferred embodiments but which are not to be construed as limiting to the scope as more broadly defined above and in the appended claims.

EXAMPLE 1

Into a one liter flask equipped with a mechanical stirrer, nitrogen inlet, thermometer and a condenser attached to a drying tube, is introduced 1 mole of I-[[[[2,3-epoxypropoxy] phenyl]-2-propyl]-phenoxy] -3-[vinyloxy] butoxy]-2-propanol, 1 mole of heptafluoro pentanol, and 0.5 gram of 85% potassium hydroxide pellets. The mixture was heated at 120° for 24 hours and at a 150° for an additional 48 hours after which heating was discontinued. Greater than 99% conversion is obtained. A product having the formula

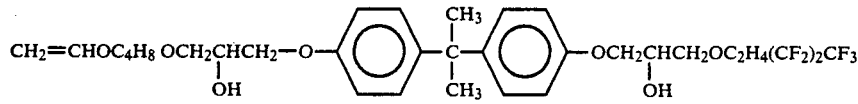

according to NMR, is recovered.

EXAMPLE 2

The procedure described in Example 1 is repeated except that the corresponding glycidyl ether of bisphenol F is substituted for the bisphenol A resin (Epon 828 epoxy resin) of Example 1. Also, decafluorohexanol is substituted for heptafluoropentanol in Example 1. About 100% conversion is achieved. A product having the structure

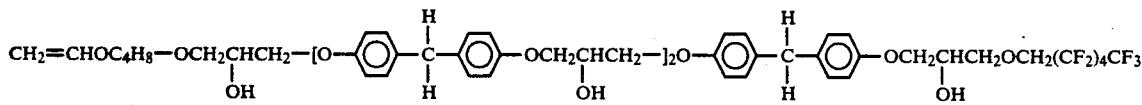

is recovered.

EXAMPLE 3

Example 1 was repeated except that heptadecyl fluorodecanol was substituted for heptafluoropentanol of Example 1. About 100% conversion was achieved. The corresponding product is recovered.

Example 1 is repeated with substitution of each of the following alcohol reactants:

$HOC_2H_4C_6F_{13}$,
$HOC_2H_4C_8F_{17}$,
$HOC_2H_4C_{10}F_{21}$ and
$HOC_2H_4C_{12}F_{25}$.

In each case about 100% conversion is achieved and the corresponding products are recovered.

EXAMPLE 4

Example 1 is repeated except that [(vinyloxy) methyl] oxirane is substituted for Epon 828 in Example 1. About 100% conversion is achieved and a product having the structure

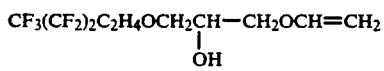

is recovered.

EXAMPLE 5

Into a one liter flask equipped with a mechanical stirrer, nitrogen inlet, thermometer and a condenser attached to a drying tube, is introduced 377 grams (1 mole) of Epon 828 epoxy resin, 107 grams (0.5 mole) of heptafluoro pentanol, 58.1 gram (0.5 mole) of 4-hydroxybutyl vinyl ether and 0.5 gram of 85% potassium hydroxide pellets. The mixture is heated at 120° for 24 hours and at a 150° for an additional 48 hours after which heating was discontinued. Greater than 99% conversion is obtained. A product having the formula

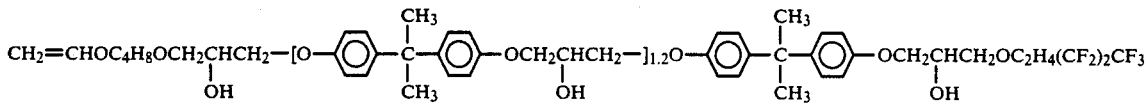

according to NMR, is recovered.

The above products are clear liquids or gel-like materials which, when coated on a substrate in a thickness of from about 0.15 to about 0.5 mil and exposed for less than one second at room temperature to 400 millijoules/cm² radiation from a medium pressure vapor lamp provide a cured soil and stain resistant barrier.

What is claimed is:

1. The fluorinated vinyl ether having the formula:

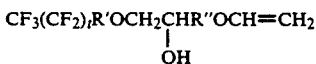

wherein t has a value of from 1 to 22; R' is $C_2$ to $C_{20}$ alkylene, alkoxyalkylene, arylene or aryloxyalkylene which radicals are optionally fluorinated; R" is a divalent radical having from 1 to 100 carbon atoms and is selected from the group of alkylene, arylene, alkarylene, aralkylene which groups are optionally substituted with lower alkyl or the radical

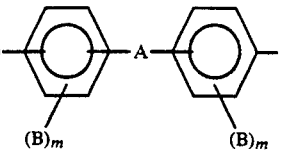

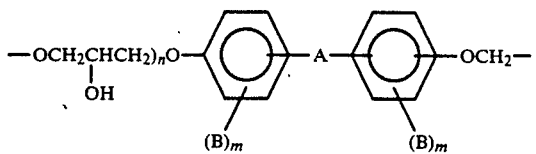

wherein R is a polyvalent linear, branched or cyclic hydrocarbon radical having from 2 to 20 carbon atoms, optionally substituted with alkyleneoxy; A is a divalent radical selected from the group of

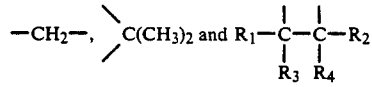

where each of $R_1$, $R_2$, $R_3$ and $R_4$ is independently hydrogen or

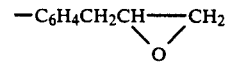

B is lower alkyl; m has a value of from 0 to 4 and n has a value of from 0 to 20.

2. The fluorinated vinyl ether of claim 1 wherein R' is alkylene and R" is $C_1$ to $C_4$ alkylene.

3. The fluorinated vinyl ether of claim 1 wherein R' is alkylene and R" is an oligomeric radical having the formula

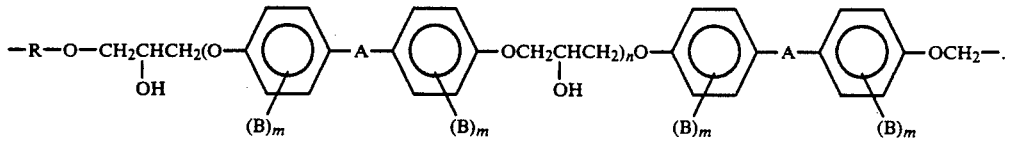

4. The fluorinated vinyl ether of claim 3 wherein m is zero; n has a value of zero or one and A is —$CH_2$— or —$C(CH_3)_2$—.

5. The fluorinated vinyl ether of claim 4 wherein R is alkylene.

* * * * *